United States Patent

[11] 3,540,680

| [72] | Inventor | Carlton G. Peterson<br>Altadena, California 91001 |
|---|---|---|
| [21] | Appl. No. | 731,900 |
| [22] | Filed | May 24, 1968 |
| [45] | Patented | Nov. 17, 1970 |
| [73] | Assignee | Lockheed Aircraft Corporation<br>Burbank, California |

[54] DUAL ROTOR SYSTEM FOR HELICOPTERS
3 Claims, 3 Drawing Figs.

[52] U.S. Cl. .................................................. 244/17.19,
244/7, 416/123, 416/170
[51] Int. Cl. .................................................. B64c 27/22,
B64c 27/82
[50] Field of Search .................................. 244/17.19,
17.21, 17.23, 17.11, 6, 7; 170/135.24; 416/123,
170

[56] References Cited
UNITED STATES PATENTS

| 2,415,622 | 2/1947 | Bossi ............................ | 244/17.21X |
| 2,698,147 | 12/1954 | Hovgard ...................... | 244/7 |
| 3,448,946 | 6/1969 | Nagatsu ....................... | 244/17.19 |

*Primary Examiner*—Milton Buchler
*Assistant Examiner*—Paul E. Sauberer
*Attorneys*—George C. Sullivan and Lowell G. Turner ABSTRACT: This rotor system provides a helicopter with forward and anti-torque thrust by the inclusion of a pair of rotors mounted in the empennage and rearwardly thereof and oriented at right angles to one another while being driven in rotation from a common shaft. Secondary drive shafts, acting through intermediate transmissions, provide the direct driving force. The rotors are independently controlled to the desired thrust rating by individual pitch controls. The anti-torque rotor is positioned at the forward region of the stabilizer chord, thereby minimizing flutter and enhancing vehicle stability.

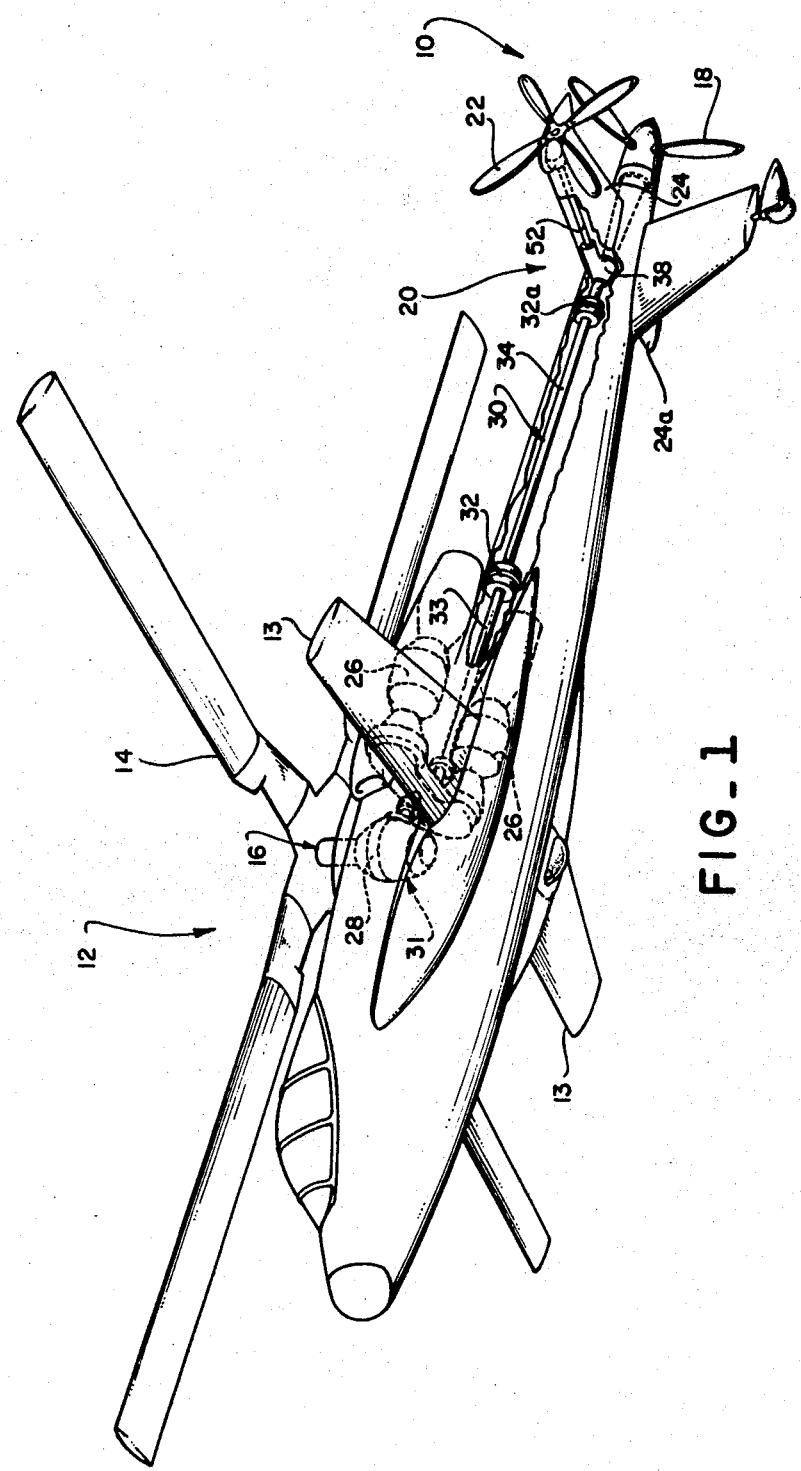
FIG._1

Patented Nov. 17, 1970
3,540,680
Sheet 2 of 2
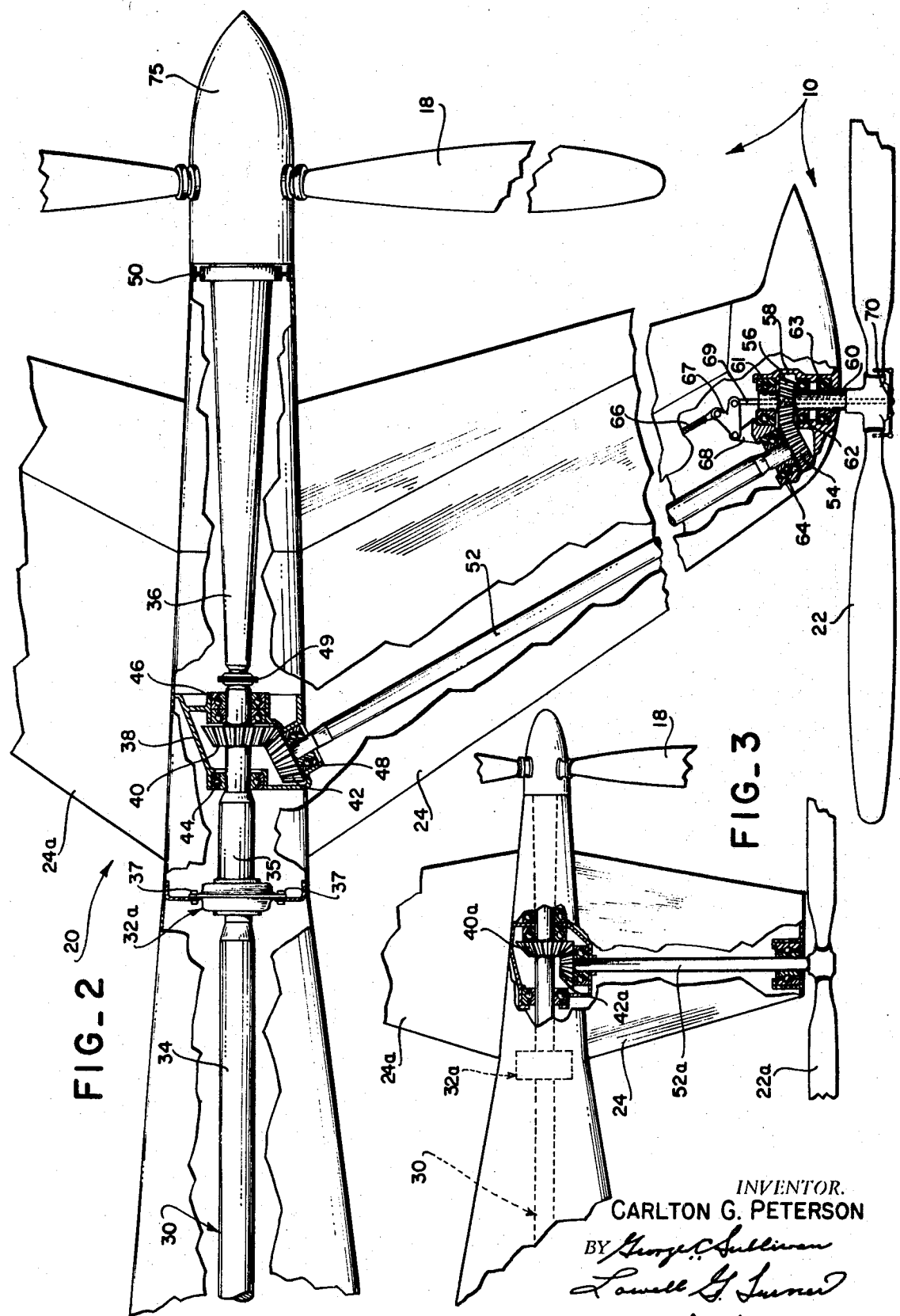
INVENTOR.
CARLTON G. PETERSON
BY George C. Sullivan
Lowell G. Turner
Agents 3,540,680

DUAL ROTOR SYSTEM FOR HELICOPTERS

BACKGROUND OF THE INVENTION

1. Field of the Invention

The invention relates generally to a means for controlling the thrust propeller and tail rotor assemblies of a compound helicopter, and more particularly, to means whereby forces produced by each can be independently controlled without the usual transition and mixing problems associated with swivel tail-type rotors and/or vane-type empennages.

2. Description of the Prior Art

Heretofore it has been proposed that forward thrust with concurrent yaw stability in compound helicopters should be obtained by utilizing swiveled or vaned empennage rotors. These methods, while technically feasible, introduce problems in transition during the swiveling phase and inherently involve mixing problems. They also require very complex control systems and are generally inefficient methods for producing the forces and stability characteristics required by such vehicles.

The combination of a mechanically driven main rotor, a forwardly mounted propeller or a side-mounted jet for forward thrust propulsion, and a tail rotor for anti-torque and yaw control have in the past been considered the most desirable combination for compound helicopters. This particular combination of thrust elements separates the independent functions and permits each subsystem to be optimized in its operation. Propulsion forces generated through such separate subsystems has also further resulted in relatively minimized constraints on the design variables for each such subsystem having an effect upon propulsive efficiency. Such systems, however, have introduced mechanical complexity and have been unduly heavy. Particular difficulty has been encountered in view of the requirement that considerable weight be located in a rearward location, the ultimate result being center of gravity problems.

SUMMARY OF THE INVENTION

The novel apparatus of the present invention overcomes the disadvantages of swiveled or vaned empennage rotors by providing an effective, but simple, system for producing forward thrust. The thrust and anti-torque operations are independent of one another and are controllable to any desired proportion of the total power available by individual pitch controls on each subsystem. This power controllability is available throughout the entire forward and rearward velocity spectrum and is relatively insensitive to rapid changes in velocity. The dual power system and the related controls permit the pilot to accelerate the vehicle from hover to full speed without noticeably feeling the transition between the helicopter and compound flight modes.

The controls are comparatively simple mechanically and in operation and have no dual functions, maximum yaw control for the most demanding maneuvers being available throughout the range of the speed regimes. The mutual independence of dual controls for the propeller and anti-torque mechanisms provides the further advantage of being driven off a common drive shaft without the usual transition parameters encountered in other types of control systems.

It is, therefore an object of this invention to provide a simple system for attaining efficient forward thrust and anti-torque compensation behind and at the empennage of a compound helicopter vehicle while minimizing flutter and stability problems inherent to such vehicles.

Another object of the invention is to provide a helicopter in which a single drive shaft controls both a thrust propeller and an anti-torque rotor, the rotor and the propeller operating independently of one another and being controllable to any desired proportion of the total power available.

Still another object of the invention is to provide apparatus for obtaining forward thrust and anti-torque compensation of a compound helicopter and wherein both the yaw and anti-torque rotors are mounted on the horizontal stabilizer, rather than on the vertical stabilizer, as in normal practice, and are independent of the thrust propeller, the respective rotors being controllable to any desired proportion of total power.

Other objects and advantages of the present invention will become apparent from the following detailed description of the preferred embodiments illustrated in the accompanying drawings in which:

BRIEF DESCRIPTION OF THE DRAWINGS

FIG. 1 is a perspective view in partial cutaway of the novel dual rotor system of the invention shown on a compound helicopter;

FIG. 2 is an enlarged cutaway view of the dual rotor system of FIG. 1, illustrating the mechanical driving means and associated rotor and propeller connections; and FIG. 3 is an enlarged cutaway view of the dual rotor system illustrating an alternative embodiment of the configuration of FIG. 2.

DESCRIPTION OF THE PREFERRED EMBODIMENT

Referring to FIGS. 1 and 2. a novel dual rotor system is illustrated in the general region designated by the arrows 10. It is shown there as being incorporated as part of the propulsion system of a compound helicopter 12.

The compound helicopter 12 employs a pair of relatively small wings 13 for conventional aerodynamic lift and a primary rotor 14, preferably a rigid rotor, oriented to revolve substantially in a horizontal plane about its drive shaft 16 in a conventional manner providing vertical thrust, a portion of the forward thrust and lateral stability. A propeller 18, which may have both pusher and puller capabilities, is mounted on a tail section 20. It provides additional forward and/or reverse thrust for the compound flight mode. Anti-torque and yaw control are regulated by a tail rotor 22, preferably located on the left horizontal stabilizer of the helicopter 12. The tail rotor 22 is functionally decoupled (insofar as pitch control is concerned) from the propeller 18 so that both may be designed for best efficiency in their individual roles over the entire speed range.

Because of the inherent independence of each control, the pilot has maximum yaw control power available for the most demanding maneuvers at all speeds. Short running take-offs can be performed using the thrust propeller 18 for forward propulsion and accelerating with an unloaded rotor until sufficient speed is reached for lifting very heavy loads, at which time the rotor is loaded and lifting forces are brought into play. Thus the rotor and the wings provide that degree of lift required to accomplish the assigned task.

Inherent safety features are provided in case of engine failure. The thrust propeller 18 can, for example, also be used as a windmill which will act to maintain main rotor r.p.m. until the proper conditions are established for a safe auto-rotational landing. In addition, through the use of this invention, full yaw control is maintained during the entire maneuver and no control transition is required during deceleration.

The left horizontal stabilizer 24, while similar in planform to the right horizontal stabilizer 24a, may be deeper in cross section in order to accommodate the drive and control mechanism necessary for vehicle operation and to accept the additional loading applied by the rotor 22.

The helicopter 12 is provided with an engine 26 and a clutch 28 which act in a conventional manner to rotate a longitudinally extending drive shaft 30. As the primary rotor 14 is rotated in the air by the engine 26 a reaction torque is exerted upon the helicopter 12 which tends to rotate the vehicle in a direction opposite to the direction of primary rotor rotation. The anti-torque tail rotor 22 is positioned so as to exert a resisting or counter-thrust against this rotational tendency. In this sense these components act in a conventional manner.

The drive system for the dual rotors of this invention is designed such that only two means or gear boxes (only one in the case of the FIG. 3 configuration) are required in addition to a transmission 31. By contrast, most current operational helicopters have three or more gear boxes, while many operative vehicles require as many as ten gear boxes.

The propeller drive shaft 30, as best shown in FIG. 2, consists of a plurality of connected segments leading from the main transmission 31 and is supported by a plurality of couplings such as those illustrated at 32 and 32a. Segments of the drive shaft 30 are usually sized to provide a safe margin of strength above a torque surge condition and to have natural frequencies at least 50 percent higher than operating speed. The couplings 32 and 32a are arranged to promote continuous bending stiffness across the support. A series of individual drive shaft sections 33, 34, 35 and 36 are connected together to constitute longitudinal drive shaft 30 conventionally jointed (e.g., splined) and fastened, as by bolts 37 positioned in appropriate clearance holes.

An angle drive gear box 38, sometimes referred to as power dividing means, is positioned between the drive shaft segments 35 and 36 and contains gears for mechanically dividing the power transmitted through the drive shaft 30, as by the illustrated gear system. A first bevel gear 40 is mounted for rotation upon the drive shaft segment 35 and a second bevel gear 42 engages the bevel gear 40. The bevel gear 40 is disposed within the gear box 38 such that its axis is in substantial axial alignment with drive shaft sections 35 and 36. A single bearing 44 and a double bearing 46 support the shaft segment 35 and the bevel gear 40 in a rotational relationship and a separate bearing 48 supports the bevel gear 42 for rotation.

The propeller drive shaft section 36, which is in reality a separate shaft, is connected at one end to the drive shaft section 35 through a coupling 49 and its opposite end is supported by a mounting bracket 50.

The bevel gear 42 in FIG. 2 is disposed at an acute angle with respect to the drive shaft section 36 such that it permits the installation of an anti-torque rotor drive shaft 52 along the forward portion of the left horizontal stabilizer 24 for the best center-of-gravity distribution.

A second set of bevel gears 54 and 56 is mounted opposite the gear box 38 and within a second gear box 58 in the extremity of the left horizontal stabilizer 24, the gear 54 being fixed to an end of the anti-torque rotor drive shaft 52.

A drive shaft 60 attached to the bevel gear 56 and mounted for rotation in the gear box 58, is rotatably supported by bearings 61, 62 and 63, a bearing 64 being provided to similarly support the adjacent end of the drive shaft 52. The drive shaft 60 is fixedly connected to the anti-torque rotor 22 for driving the same in rotation. The axis of the drive shaft 60 is oriented at right angles to the longitudinal axis of the helicopter 12 and such that the plane of rotation of anti-torque rotor 22 is substantially parallel to that axis. Therefore, as the tail rotor drive shaft 52 is caused to rotate through the action of the drive shaft 30 and the gears in the gear box 38, the bevel gear 54, engaging bevel gear 56, causes the bevel gear 56 and the shaft 60 to rotate at a predetermined gear ratio. It will be noted that since there is a direct connection from the main rotor 14 through the transmission 31, the drive shafts 30 and 52, and the gear boxes 38 and 58, to the tail rotor 22, that tail rotor 22 is caused to rotate a predetermined r.p.m. with respect to the main rotor.

Thrust control of the rotor 22 is accomplished by changing its pitch via its actuation through the control line 66, leading from the pilot's station. As the control line 66 is actuated, it causes a crank 67 to rotate about a pivot upon a mounting bracket 68 affixed to the structure of the left horizontal stabilizer 24. As the crank 67 rotates it causes a control rod 69 which is disposed through a hollow portion of the shaft 60 to actuate pitch control linkage 70, causing the pitch of the rotor 22 to change in correspondence with the amount of force exerted. Thus, the anti-torque rotor 22, being directly coupled to the main rotor 14, rotates continuously unless decoupled through the clutch 28. Since yaw control is a function of the thrust exerted by the anti-torque rotor 22, and that thrust is controlled, in turn, by the pitch of that rotor, the yaw is readily controllable by the pilot through his actuation of the control line 66. The r.p.m. of the rotor 22 can, of course, be preselected by fixing the ratio of the bevel gears 40 and 54 to the bevel gears 42 and 56, respectively.

FIG. 3 illustrates a second embodiment of the invention wherein respective axes of the bevel gears 40a and 42a are disposed normal to one another. Because the shaft 52a is normal to the shaft 30 and the propeller 22a is affixed directly to the end of the shaft 52a, the plane of rotation of the propeller 22a is parallel to the vehicle's axis and there is no need for spur gears such as those adjacent the propeller in FIG. 2. While rotation of the rotor 22 can be accomplished using either of the configurations illustrated in FIGS. 2 or 3, the configuration of FIG. 2 is generally preferable since: (1) it permits installation of the control mechanism required to change the pitch of the rotor 22 in a more convenient manner; (2) the orientation of the anti-torque rotor axis may be designed in any given direction, and (3) dihedral may be designed into the horizontal stabilizer while retaining the orientation of the tail rotor shaft in alignment with the main shaft.

The propeller drive shaft section 36 (FIG. 2) is supported at its end opposite the coupling 49 by the mounting bracket 50. As the shaft 36 is caused to rotate it likewise causes rotation of a spinner 75 upon which the propeller 18 is mounted.

The spinner 75 is hollow so as to permit a control mechanism (not shown) which is similar to control line 66, crank 67 and control rod 69 to change the pitch of the propeller 22. Thus, while both the propeller 18 and the rotor 22 are coupled directly from the shaft 30 to the main rotor 14, the forces which they exert can be individually controlled by changing the pitch of one or both of these controls. Therefore, the pilot can keep the vehicle at a stationary position while exerting a force to counteract cross winds causing the vehicle to rotate about its yaw axis. He can also cause the forward propulsive force to be greatly increased by increasing the pitch. He can additionally reverse the pitch and, through the cooperative action of the main rotor, actually cause the helicopter 12 to move in a backward direction without changing the attitude of the helicopter as is necessary in conventional vehicles.

By contrast to these beneficial control actions it is difficult or impossible to accomplish these things using a swivel tail or vaned empennage rotor since these rotors cannot be individually controlled as to their forward and anti-torque forces.

While particular embodiments of the present invention have been shown and described, it will be obvious to those skilled in the art that changes in modifications may be made without departing from this invention in its broader aspects and therefore the aim in the appended claims is to cover all such changes and modifications as fall within the true spirit and scope of this invention.

I claim:

1. In a compound helicopter including a controllable drive shaft singly extending in along a longitudinal axis of its fuselage, a thrust propeller axially aligned with and operatively connected to said drive shaft and being disposed at the tail of such fuselage, a rotor blade and shaft therefor disposed at a lateral end of a stabilizer for the compound helicopter, the improvement comprising:

a rotatable shaft having inboard and outboard ends and being disposed in said stabilizer;

first and second transmission units each associated with a respective end of said rotatable shaft;

the first of said units mounted on said controllable drive shaft and cooperatively connecting said thrust propeller and rotatable shaft thereto and whereby power from said drive shaft is divided between said propeller and rotatable shaft;

the second of said units mounted on the shaft of said rotor blade and cooperatively connecting said rotatable shaft thereto; and whereby said controllable drive shaft controls both the rotor blade and thrust propeller through said units to desired proportions of the total power available through said drive shaft.

2. The improvement of claim 1 in which each of said units includes a pair of meshing bevel gears, one of such meshing gears in the first of said units being fixedly mounted on said controllable drive shaft, the other of such meshing gears being fixedly mounted on the inboard end of said rotatable shaft, one of such meshing gears in the second of said units being fixedly mounted on the outboard end of said rotatable shaft, the other of said meshing gears being fixedly mounted on said shaft of the rotor blade.

3. A dual rotor control mechanism for controlling a helicopter which comprises:

a first controllable drive shaft rotatably mounted in the helicopter fuselage;
a transmission coupled to said drive shaft, said transmission including first and second mutually engaged bevel gears, said first bevel gear being rotatably coupled to said drive shaft;
a second drive shaft in axial alignment with and fixedly connected to said first drive shaft;
a propeller connected to an end of said second drive shaft for producing thrust for the helicopter;
a third drive shaft rotatably coupled to said second bevel gear and extending outward at an angle from said first drive shaft and through a horizontal stabilizer in the helicopter, said third drive shaft having a third bevel gear connected thereto at the end opposite said second bevel gear;
a fourth bevel gear engaging said third bevel gear and rotatable thereby;
a fourth drive shaft connected to said fourth bevel gear and rotatable therewith; and
a tail rotor mounted on said fourth shaft at the lateral end of such stabilizer for rotation responsive to the rotation of said first drive shaft.